United States Patent [19]
Peled et al.

[11] 4,456,665
[45] Jun. 26, 1984

[54] CALCIUM ELECTROCHEMICAL RESERVE CELL

[75] Inventors: Emanuel Peled, Even Yehuda; Azieh Meitav, Rishon-Lecion; Mordechai Brand, Tel Aviv, all of Israel

[73] Assignee: Ramot University Authority For Applied Research and Industrial Development Ltd., Tel Aviv, Israel

[21] Appl. No.: 396,839

[22] Filed: Jul. 9, 1982

[30] Foreign Application Priority Data

Jul. 16, 1981 [IL] Israel .................................... 63337

[51] Int. Cl.³ ............................................. H01M 4/36
[52] U.S. Cl. ..................................... 429/105; 429/110; 429/196; 429/199
[58] Field of Search ................. 429/101, 105, 196, 115, 429/113, 110, 199

[56] References Cited

U.S. PATENT DOCUMENTS

| | | | |
|---|---|---|---|
| 4,150,198 | 4/1979 | Domeniconi et al. | 429/196 X |
| 4,200,684 | 4/1980 | Bro | 429/196 X |
| 4,352,866 | 10/1982 | Klinedinst | 429/105 X |

*Primary Examiner*—Charles F. LeFevour
*Attorney, Agent, or Firm*—Toren, McGeady and Stanger

[57] ABSTRACT

There is provided an electrochemical reserve cell of short activation time, which comprises a calcium dischargeable calcium alloy anode essentially devoid of alkali metal, an inorganic oxyhalide liquid cathode serving also as solvent for the electrolyte salt, an electrolyte salt consisting of Lewis acid and a calcium Lewis base, said Lewis acid being in excess of the Lewis base, and an inert current collector, said electrolyte solution being stored separately from said electrode compartment, means being provided for contacting said solution with said electrodes when the cell is to be activated.

12 Claims, 2 Drawing Figures

CALCIUM ELECTROCHEMICAL RESERVE CELL

FIELD OF THE INVENTION

The invention relates to a novel type of an electrochemical reserve cell which is of the high-rate fast-activated type. The novel cell is safe in use and it is based on a calcium (or calcium alloy substantially devoid of alkali metals) anode, an oxyhalide as liquid cathode and as solvent for an electrolyte salt, an electrolyte salt comprising a Lewis acid in excess and a Lewis base of calcium, and a suitable current collector.

The electrolyte is stored apart from the electrode compartment, and when the cell is to be activated, the said electrolyte is introduced into said electrode compartment, activating the cell. The liquid cathode and solvent of choice for the electrolyte salt is thionyl chloride.

BACKGROUND OF THE INVENTION

In U.S. Pat. Nos. 4,184,014, 4,093,784 and 4,042,756 and in German Pat. No. 2,262,256 there are described electrochemical cells having an alkali metal or alkaline earth metal anode, an oxyhalide as cathode and as solvent for an electrolyte salt, an electrolyte salt comprising a lithium cation and a current collector.

The lithium-thionyl chloride cell has the highest energy density of commercially available primary cells. It has a very good low- and high-temperature performance, excellent shelf life and a very high power density in its high-rate configuration. However, the major obstacle to the commercialization of a high-rate type cell, and in particular, a high-rate multicell battery is its well known explosion hazard during reversal or charging. This hazard is common to all high-rate nonaqueous lithium batteries. Reversal of one or more cells or the charging of one row of cells by another row connected in parallel is likely to happen during deep discharge. The reason for this is that lithium is deposited at low over-potentials, on itself, or on a passivated cathode. The metallic lithium which deposits under these conditions is likely to have a large active surface area. At a high deposition rate, a powder like lithium deposit can be formed. The presence of lithium powder in a thionyl-chloride cell can create a very hazardous condition. On prolonged reversals or charging of a lithium cell there is the danger of an internal short circuit due to lithium dendrite growth. This may lead to internal spark which can rapidly melt, or even evaporate, the lithium dendrite, thereby initiating a cell explosion. This explosion is more likely to happen in a partially discharged cell where less electrolyte is available to cool the spark area.

Calcium has a much higher melting point (838° C.) than lithium (180.5° C.). Therefore, the probability that an internal spark will lead to evaporation or melting of calcium is much smaller.

The activation time for a reserve cell of this type ought to be as short as possible. An activation time of 1 second for small batteries and cells, and of about 5 seconds for large batteries is acceptable. U.S. Pat. No. 4,150,198 discloses a reserve cell comprising an inorganic oxyhalide solvent and a Lewis acid solute dissolved therein as the sole salt with an oxidizable active anode, which is preferably lithium. The present invention overcomes the safety problem of cells of the prior art and it has a shorter activation time.

SUMMARY OF THE INVENTION

The invention relates to an electrochemical reserve cell, which is of the high-rate fast-activated type. The novel cell is safe even under adverse conditions of use. It comprises a calcium (or calcium alloy substantially devoid of alkali metal) anode; an oxyhalide or mixture of oxyhalides as liquid cathode and as solvent for the electrolyte; and as electrolyte salt it comprises a Lewis base of calcium and a Lewis acid in excess, as well as a suitable current collector.

The liquid cathode of choice is thionyl chloride, which is reduced on the current collector. The current collector is advantageously porous carbon, which may contain a certain quantity of a metal or metal oxide catalyst. Metals such as copper, iron, tungsten or oxides of same are suitable catalysts and they may be incorporated in the porous carbon current collector so as to constitute 1 to 50 percent by weight, calculated on the weight of the current collector.

The electrolyte salt dissolved in the inorganic oxyhalide comprises calcium as essentially sole cation and a Lewis acid such as $FeCl_3$, $BCl_3$, $AlCl_3$, $AlBr_3$, or $FeBr_3$ in excess. It ought to be substantially devoid of alkali metal cations. The components of the cell ought to be dry.

The cell comprises essentially two parts: that of the electrodes, and a container of the electrolyte. When the cell is to be activated, the electrolyte is injected into the electrode compartment.

The activation time of cells according to the present invention is rather short; as can be seen from the following examples, it is of the order of about 1.3 seconds to a voltage of 2 V. This ought to be compared with an activation time of about 15 seconds of a cell of the type disclosed in U.S. Pat. No. 4,150,198 (see FIG. 1).

The cells according to the present invention are safe against charging or reversal of one cell out of a pllurality of interconnected cells, or even of all of these.

The current collector of choice comprises carbon powder bonded with Teflon. Furthermore, the electrolyte may contain up to about 15 colume (v/o)% sulfur dioxide which improves the conductivity of the electrolyte and also the performance of the cell.

DESCRIPTION OF THE PREFERRED EMBODIMENT

The invention is illustrated with reference to the following examples which are to be construed as illustrative and in a non-limitative manner.

EXAMPLE 1

Figure 1:
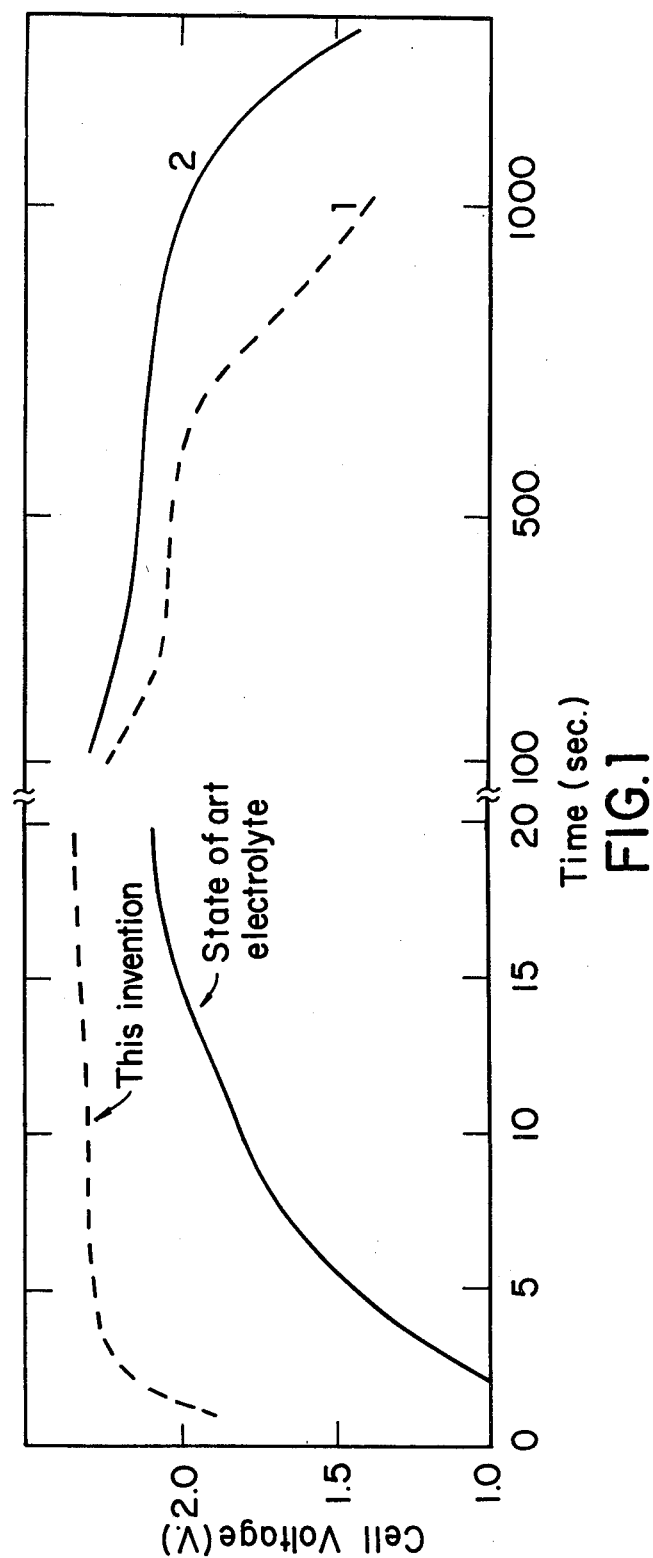
FIG. 1 illustrates discharge curves for calcium/thionyl chloride cells of the reserve type.
Figure 2:
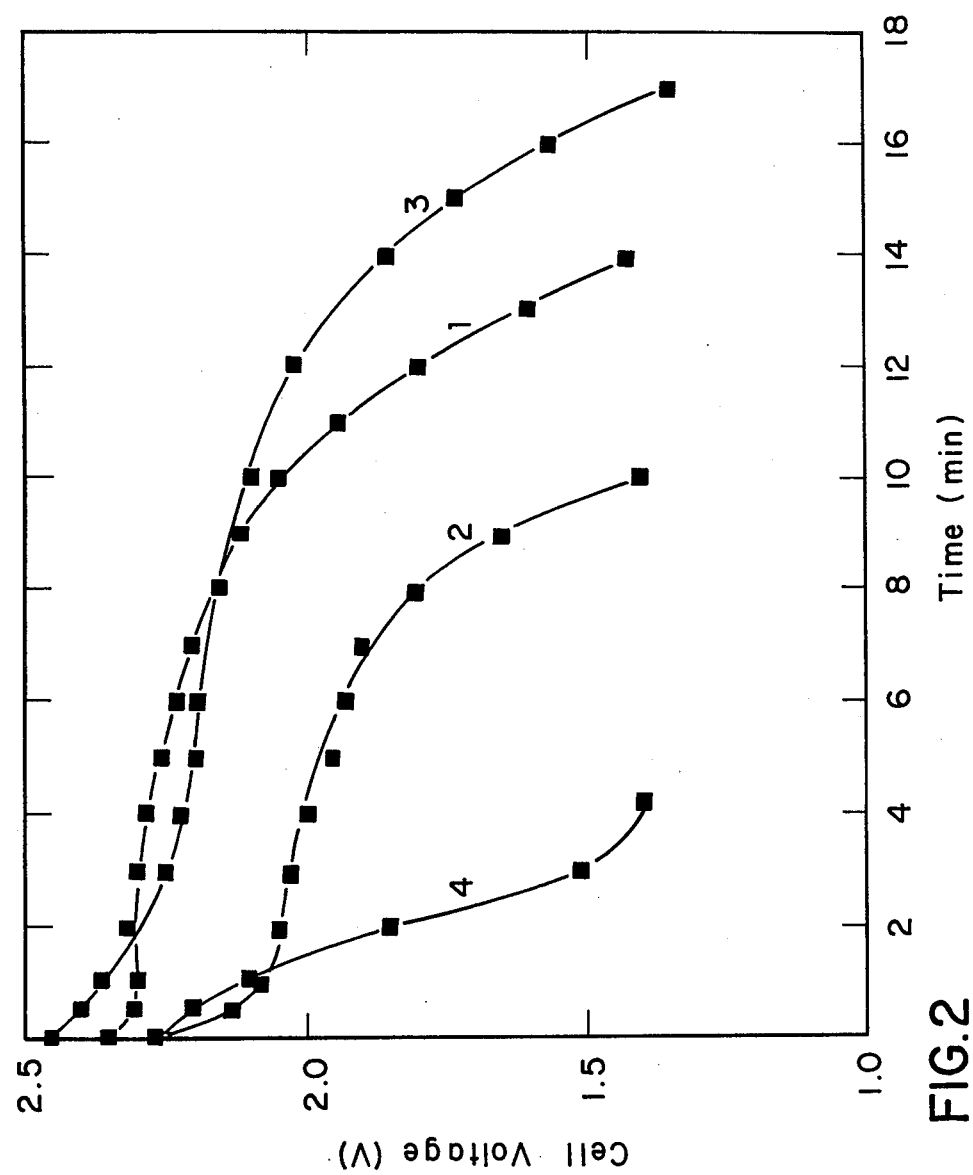
FIG. 2 illustrates the effect of temperature and electrolyte concentration on the discharge performance of reserve cells of the invention.

Hermetically sealed glass cells containing a flat 0.5 mm thick calcium anode and a flat 1.1 mm thick Teflon-bonded carbon cathode were assembled inside a glove box. The electrode area was 5 $cm^{-2}$. A non-woven 0.18 mm thick glass separator paper was inserted between the cathode and the anode. The two electrodes were supported by two stainless steel plates held together with four bolts, which tightened at a constant force. The cathode was isolated from this support plate by glass separator paper. An electrolyte reservoir was attached to the cell through a Teflon "Rotaflo" stopcock. Fluka A. R. $AlCl_3$ was sublimed under vacuum, Merck A. R. $SOCl_2$ was twice distilled under vacuum, and Baker A. R. $CaCl_2$ was vacuum dried for 24 hr at 250° C. The electrode compartment was evacuated before the discharge test. The cell was activated by opening the Teflon stopcock and letting the electrolyte fill the cell under atmospheric pressure. The cell was loaded before the activation process. It can be seen that the activation time (to 2.0 V on 8.2Ω) of cell which was activated by 0.55M $CaCl_2$+2.2M $AlCl_3$-thionyl chloride solution is 1.3 seconds which was the time needed to fill the cell with the electrolyte (FIG. 1, Curve-1). A cell which was activated by "state of art" solution with 2.2M $AlCl_3$ as the sole solute had an activation time, to 2.0 V on the same load, of 15 seconds (FIG. 1, curve-2). This long activation time may be unacceptable for many applications. The activation time of the cell according to this invention can be made shorter by a faster way of injection of the electrolyte into the cell. The cell with the state of art electrolyte had about 25% more capacity than the example according to this invention. However the capacity of the cell according to this invention was not yet optimalized and a higher capacity is expected for cells with lower concentration of calcium cations. As can be seen in FIG. 2 when the Lewis base ($CaCl_2$) concentration was increased from 0.55M to 0.85M the discharge time (to 1.5 V) decreases from 16 to about 10 minutes. Increasing the temperature of discharge increases the capacity of the cell as can be seen in FIG. 2. A cell with 2.8M $AlCl_3$+1.2M $CaCl_2$ had about 3 minutes of discharge time (to 1.5 V) at 23° C., while at 60° C. it was discharged for more than 16 minutes. A similar effect was found for cells having 2.1M $AlCl_3$+0.85M $CaCl_2$ (FIG. 2).

EXAMPLE 2

Safety Tests

Several "sandwich-like" calcium cells containing either state of art electrolyte-1M $LiAlCl_4$, or 1.3M $Ca(AlCl_4)_2$ electrolyte according to the present invention were similarly charged or overdischarged at 0.1–30 mA $cm^{-2}$. Cells containing either $Ca/LiAlCl_4$ or $Ca/Ca(AlCl_4)_2$ were charged at current density or 10 mA $cm^{-2}$. The voltage of the cells containing $Ca(AlCl_4)_2$ electrolyte rose rapidly to −45 volts. This was accompanied by massive gas evolution. When the current was turned off, the cell voltage dropped to 3.7–4.0 volts during 0.1–0.2 sec. and then decreased further but more slowly (1–2 minutes) to the usual O.C.V. (3.0–3.2 V).

Prolonged potentiostatic charging of $Ca/Ca(AlCl_4)_2$ cells was carried out. The cells were charged at a constant voltage of 30 volts for 30 hours. The initial current density was ca. 0.2 mA $cm^{-2}$ which dropped to 80–100 $\mu A$ $cm^{-2}$ after 5–10 minutes decreasing further to 10–20 $\mu A$ $cm^{-2}$ after 1–2 hours, then remaining almost constant at this level.

Charging of cells containing $LiAlCl_4$-state of art electrolyte showed a significantly different behaviour. The charging voltage of these cells was relatively low (ca. 4 volts) and no gas evolution was observed. When the current was turned off, the O.C.V. was 3.7–4.0 volts and decreased slowly to 3.65–3.7 V where it remained constant for a relatively long period of time, (which depends on the charge).

Cathode-limited cells containing $LiAlCl_4$ and $Ca(AlCl_4)_2$ were fully discharged at 1 mA $cm^{-2}$ or 20 mA $cm^{-2}$ and then a further discharge was forced by an external power supply. When low reversal currents (0.5–5 mA $cm^{-2}$) were applied to cells containing $Ca(AlCl_4)_2$, the cell voltage changed rapidly to −15 V, then increased monotonically for about thirty minutes up to 30–40 volts. When higher current densities were applied, the reverse voltage rose immediately to ca. −40 volts and massive evolution of gas occurred. In all cases, when the current was turned off, the cell voltage fell rapidly (less than 0.1 sec.) to +2.5 V. Fully discharged $Ca(AlCl_4)_2$ cells were overdischarged potentiostatically for 24 hours at a constant voltage of 35 volts (at room temperature). The initial current density was 20–30 mA $cm^{-2}$ decreasing to 80–100 $\mu A$ $cm^{-2}$ after 3–5 hours.

Cells containing state of art $LiAlCl_4$ electrolyte showed a significantly different behaviour on reversal tests. The reverse voltages were relatively low, not exceeding 3 volts at a current density of 30 mA $cm^{-2}$. In contrast to this invention ($Ca/Ca(AlCl_4)_2$ cells), $Ca/LiAlCl_4$ cells showed a very steady reverse voltage at all current densities and no gas evolution was observed. When the current was turned off, the cell voltage was about 0.5 V and remained at this value for up to several hours (depending on the duration of reversal test).

We claim:

1. An electrochemical reserve cell of short activation time comprising:
    a calcium dischargeable calcium alloy anode essentially devoid of alkali metal;
    an inorganic oxyhalide liquid cathode serving also as solvent for the electrolyte salt;
    an electrolyte salt consisting of Lewis acid and a calcium Lewis base, said Lewis acid being in excess of the Lewis base, and an inert current collector;
    said electrolyte solution being stored separately from said electrode compartment, means being provided for contacting said solution with said electrodes when the cell is to be activated.

2. A reserve cell according to claim 1, wherein the liquid cathode is thionyl chloride.

3. A reserve cell according to claim 1, wherein the Lewis acid is selected from aluminum chloride, aluminum bromide, boron trichloride, iron trichloride, iron thibromide and a mixture of any of these.

4. A cell according to claim 1, wherein the Lewis base is selected from calcium chloride, calcium bromide and calcium oxide.

5. A cell according to claim 1, wherein the concentration of the Lewis acid is from 1.5M to 3M.

6. A cell according to claim 1, wherein the concentration of the Lewis base is from 0.1M to saturation.

7. A cell according to claim 1, wherein the current collector comprises porous Teflon-bonded carbon.

8. A cell according to claim 7, wherein the porous current collector comprises up to 50 wt-% of a catalytically active metal or metal oxide.

9. A cell according to claim 8, wherein the catalyst is selected from copper, iron, or tungsten, and oxides of same, and from a mixture of same.

10. A cell according to claim 1, containing up to 15 v-% sulfur dioxide.

11. A cell according to claim 1, wherein the anode is calcium which has been annealed in an inert atmosphere at 450°–750° C. prior to cell assembly.

12. A multi-cell battery comprising a plurality of cells claimed in claim 1.

* * * * *